US005641052A

United States Patent [19]
Lazzarotti et al.

[11] Patent Number: 5,641,052
[45] Date of Patent: Jun. 24, 1997

[54] APPARATUS AND METHOD FOR HANDLING FLOW OF PACKAGES

[75] Inventors: S. James Lazzarotti, Broomall; Eugene T. Mullin, Phoenixville, both of Pa.

[73] Assignee: Lockheed Martin Tactical Systems, Inc., New York, N.Y.

[21] Appl. No.: 478,410

[22] Filed: Jun. 7, 1995

Related U.S. Application Data

[62] Division of Ser. No. 176,063, Jan. 3, 1994, abandoned.

[51] Int. Cl.$^6$ .................................................. B65G 47/12
[52] U.S. Cl. ........................................... 198/445; 198/360
[58] Field of Search ............................... 198/359, 360, 198/442, 444, 445, 566, 463.6, 607, 459.7; 193/31 R, 31 A

[56] References Cited

U.S. PATENT DOCUMENTS

| | | | |
|---|---|---|---|
| 510,670 | 12/1893 | Behlert | 193/31 R |
| 938,252 | 10/1909 | Laughlin | 193/31 R |
| 1,939,184 | 12/1933 | Neuman . | |
| 2,296,683 | 9/1942 | Morgan et al. | 80/43 |
| 2,746,707 | 5/1956 | Petrea | 198/358 |
| 2,961,085 | 11/1960 | Stovall . | |
| 2,973,109 | 2/1961 | Gable . | |
| 3,034,665 | 5/1962 | Speaker . | |
| 3,145,825 | 8/1964 | Carter . | |
| 3,227,263 | 1/1966 | Kastenbein | 198/607 |
| 3,236,355 | 2/1966 | Barnard et al. . | |
| 3,467,238 | 9/1969 | Fry et al. . | |
| 3,747,781 | 7/1973 | Daigle et al. . | |
| 3,771,641 | 11/1973 | Jonsson et al. | 198/444 |
| 3,806,115 | 4/1974 | Wojtowicz et al. . | |
| 3,814,415 | 6/1974 | Hunter et al. . | |
| 3,817,516 | 6/1974 | Lazzarotti et al. . | |
| 3,847,383 | 11/1974 | Wojtowicz et al. . | |
| 3,884,370 | 5/1975 | Bradshaw et al. . | |
| 3,927,876 | 12/1975 | Wojtowicz et al. . | |
| 3,938,654 | 2/1976 | Mohr | 198/360 |
| 4,106,636 | 8/1978 | Ouimet et al. . | |
| 4,120,393 | 10/1978 | Motooka et al. | 198/463.6 |
| 4,136,780 | 1/1979 | Hunter et al. . | |
| 4,149,622 | 4/1979 | Bradshaw et al. . | |
| 4,150,743 | 4/1979 | Lazzarotti et al. . | |
| 4,161,244 | 7/1979 | Hunter et al. . | |
| 4,167,476 | 9/1979 | Jackson . | |
| 4,227,607 | 10/1980 | Malavenda | 198/460 |
| 4,240,538 | 12/1980 | Hawkes et al. | 198/358 |
| 4,244,672 | 1/1981 | Lund . | |
| 4,307,293 | 12/1981 | Lazzarotti et al. . | |
| 4,593,806 | 6/1986 | Tappe et al. . | |
| 4,606,660 | 8/1986 | Bradshaw et al. . | |
| 4,724,946 | 2/1988 | Cinotti . | |
| 5,050,743 | 9/1991 | Lazzarotti . | |
| 5,069,440 | 12/1991 | Lazzarotti et al. . | |
| 5,123,516 | 6/1992 | Moore . | |
| 5,407,083 | 4/1995 | Bertleff | 198/360 |

FOREIGN PATENT DOCUMENTS 61-124459  6/1986  Japan .

*Primary Examiner*—Joseph E. Valenza
*Attorney, Agent, or Firm*—Stanton D. Weinstein; Joseph A. Fischetti

[57] ABSTRACT

Apparatus and method are provided for receiving a flow of packages such as parcels or bundles, dividing it into plural streams for easier singulation, singulating each such stream, and delivering the produced packages one at a time to a user, each stream being provided to a different user. Downstream sensors are used to control a deflector which in turn divides a received flow of packages into multiple such flows and apportions the received packages among the two output flows. Singulation of each such output flow is accomplished by a plurality of inclined belts which each moves a received package upward and over its peak to drop for entry into the next stage downstream, thereby singulating the received flow in stages. These belt stages are individually controlled by further downstream sensors and motors which prevent movement of upstream such belt(s) if one or more packages, indicating a flow blockage, is sensed downstream. The output of the singulator is provided to a slide that has a series of motor-controlled detents to deliver packages to the downstream user one at a time.

7 Claims, 10 Drawing Sheets

APPARATUS AND METHOD FOR HANDLING FLOW OF PACKAGES

CROSS REFERENCE TO RELATED APPLICATIONS

This application is a division of U.S. patent application Ser. No. 08/176,063 filed Jan. 3, 1994, now abandoned, and relates to U.S. patent application Ser. No. 08/469,494 which is a divisional of U.S. Ser. No. 08/176,063 and further relates to U.S. Ser. No. 08/472,130 which is a continuation of U.S. Ser. No. 08/176,063 ABN.

FIELD OF THE INVENTION

The present invention relates to power-driven conveyors, and more particularly to conveyor systems for arranging or rearranging stream(s) of items.

BACKGROUND OF THE INVENTION

In mail processing as well as in processing for a package delivery service, it is usually necessary at some point to separate or singulate parcels, bundles and other packages one from the other. The process of separating one package from a stack or collection of same is referred to as singulation. Singulating mail pieces is an essential step in processing the mail pieces to their ultimate destination. The feeding or singulating of mail pieces and other packages one at a time from a collection of same is an essential step in the processing of such packages to their ultimate destinations. Such packages generally have a thickness or smallest linear dimension greater than ¼. A singulator separates into single spaced-apart items, a collection of mail pieces.

In the prior art, mail would be provided on a single conveyor belt to an automatic, or an attended, mail sorter. With an attended sorter, mail appears on this conveyor on demand; the conveyor is triggered by the attendant to deliver mail pieces. The attendant inputs to the sorter address information for each mail piece just before that mail piece is provided to, or inducted into, the sorter. Alternatively, the mail piece could be provided with an automatically machine-readable label or device such as a bar code sticker, but the attendant would have to orient the mail piece so that such label or device would be exposed in a position where it could be detected and read by the sorter. In any of the above situations, often the mail is delivered to the sorter in bunches, making it difficult to handle and sometimes creating jams. Manual intervention is thus required to perform the singulation process as the mail supply is delivered for handling.

In mail processing or other delivery processing, it is usually necessary at some point to singulate or separate individual pieces of mail from a bulk supply source in order to initiate processing of those mail pieces. Letter mail and flat mail are normally provided in manageable stacks which are ready for singulation by upstream operations. Parcels, bundled mail and other packages, however, are delivered in bulk form, in large containers, sacks or trays. This package mail is presently dumped onto a conveyor and moved to machine operators who must pick individual pieces from this bulk supply in order to initiate processing of these pieces. Due to the non-uniform shape and size of parcel mail pieces, this effort is time-consuming and cumbersome to the operating attendant.

Thus, there is a need to create a manageable, continuous stream or flow of packages for mail or other delivery processing. The present invention fulfills this need.

SUMMARY OF THE INVENTION

Accordingly, an object of the present invention is to provide apparatus and method for arranging or rearranging stream(s) of items by forming plural streams.

Another object of the present invention is to provide apparatus and method for arranging or rearranging stream(s) of items by longitudinally respacing successive items in the stream.

A further object of the present invention is to provide apparatus and method capable of singulating a quantity of packages such as while they are in motion.

Still another object of the present invention is to provide apparatus and method capable of accepting an intermixed supply of parcel and bundled mail, metering and controlling the flow of such mail, processing and singulating such mail, and disseminating that mail to a multiplicity of input stations for sortation.

A still further object of the present invention is to provide apparatus and method capable of eliminating the task of selecting and handling individual pieces of mail in preparation for insertion into sorting and processing machinery, thereby significantly lowering operating and equipment costs while increasing the ability of such sorting and processing machinery to perform at its full potential productive rate.

Yet another object of the present invention is to provide apparatus and method for apportioning a flow of packages among a plurality of conveyors, based on flow in each such conveyor and thus the ability of each such conveyor to accept such packages.

A still further object of the present invention is to provide apparatus and method capable of providing a stream or series of packages to a user one at a time and sufficiently separated for individual processing of such packages.

Still another object of the present invention is to provide apparatus and method capable of preventing production of more than one package at a time to a user such as a sorting machine.

Yet another object of the present invention is to provide a singulation function which relieves attendants of some mail handling burdens, and is capable of automatically delivering singulated mail pieces to operators as quickly as they are needed for processing.

Still another object of the present invention is to provide apparatus and method capable of improved item handling productivity and reduced operator fatigue.

Briefly, these and other objects of the present invention are accomplished by a package handling and separation system, which is intended to make sorting such packages easier. Parcels, bundles and/or other packages are provided to the input of the system, usually at irregular rates and often in bunches. One or more laterally movable slides divide this flow of packages among two or more branch flow paths. Each such slide includes two plates that are hinged together at facing edges and to at least one vertical support at such edges. These plates can for example each be metal plates. The opposite edges of these plates slide on a fixed base having sloping sides. Lateral movement of the support(s) moves the center of the slide towards one or the other of a pair of receiving conveyors, while such lateral movement, in cooperation with the slope-sided base, changes the relative angle of the two plates and the support(s). Position of the support(s) is controlled by flow monitors or sensors (such as photoelectric sensors) in the two receiving conveyors. In this manner, the relative proportion of mail provided to each of the two receiving conveyors can be adjusted as needed. In extreme positions, the entirety of the received flow of packages can be provided to one or the other of the two conveyors, if and as desired. Each such receiving conveyor can itself provide its flow to a similar such slide, so that ultimately a large number of receiving conveyors can be used to handle a large flow of packages.

Each of these receiving conveyors is substantially horizontal, and includes several upwardly tilted conveyor belts that transport the packages away from the slide. The separation between the belts separates the packages, so that a continuous, rather than an ebbing and surging, flow of packages is provided. Each such belt pulls a package upwards, and then lets the package fall over to the next belt, to accomplish separation or singulation of the packages.

A pair of extended fingers or members, preferably located at the output of each receiving conveyor, prevents production of more than one package at a time from the receiving conveyors. These fingers are intended to prevent passage of side-by-side packages. The number of fingers can be adjusted to accommodate an expected package size.

Each receiving conveyor provides packages to a respective buffer inserter which has a number of upwardly extending members, disposed in parallel, which catch and retain the packages individually. These members are connected to and moved in unison such as by a driven chain which in turn is controlled by the demand requirements of the sorter or can be controlled by being provided with a predetermined fixed rate of speed. However, the members (and if used, the chain) are moved in steps or increments, so that the packages are provided one at a time such as to the load belt of a sorter.

This package handling and singulation system can be used as an input device which accepts a flow of bulk mail of various shapes and sizes and, through its elements and conveyance, reduces the bulk flow into singularly conveyed items. The system is comprised of two major subsystems: a flow divider and a singulating belt system. The flow divider includes a tent-shaped spillway which receives the incoming flow of packages from a conveyed source of supply. As the packages are fed into the spillway, its flow is divided into two paths. The flow to each path can be fully regulated by the built-in mobility of the spillway slide system so that the divisional ratio of flow to each path can be made variable. The flow can be regulated to vary from an equalized distribution into both flow paths, to full closure of one path with full distribution to the other path. The singulating conveyor receives the flow of packages at the output of each spillway path and conveys it through a series of inclined belt module stages. Each such stage is individually controlled to advance or inhibit the flow of its occupants. This control is dictated by sensors which monitor the status of mail flow in each stage. A package is provided from an upstream such stage to a downstream such stage so long as the downstream stage is unoccupied. When such a stage senses the presence of a package, its immediately preceding upstream stage is directed to stop its advance. This process sequentially reduces the number of mail pieces which are conveyed from stage to stage at any one time, so that singulation is accomplished by the time that the items reach the user for processing.

Other objects, advantages and novel features of the invention will become apparent from the following detailed description of the invention when considered in conjunction with the accompanying drawings.

DESCRIPTION OF THE PREFERRED EMBODIMENTS

Figure 1:
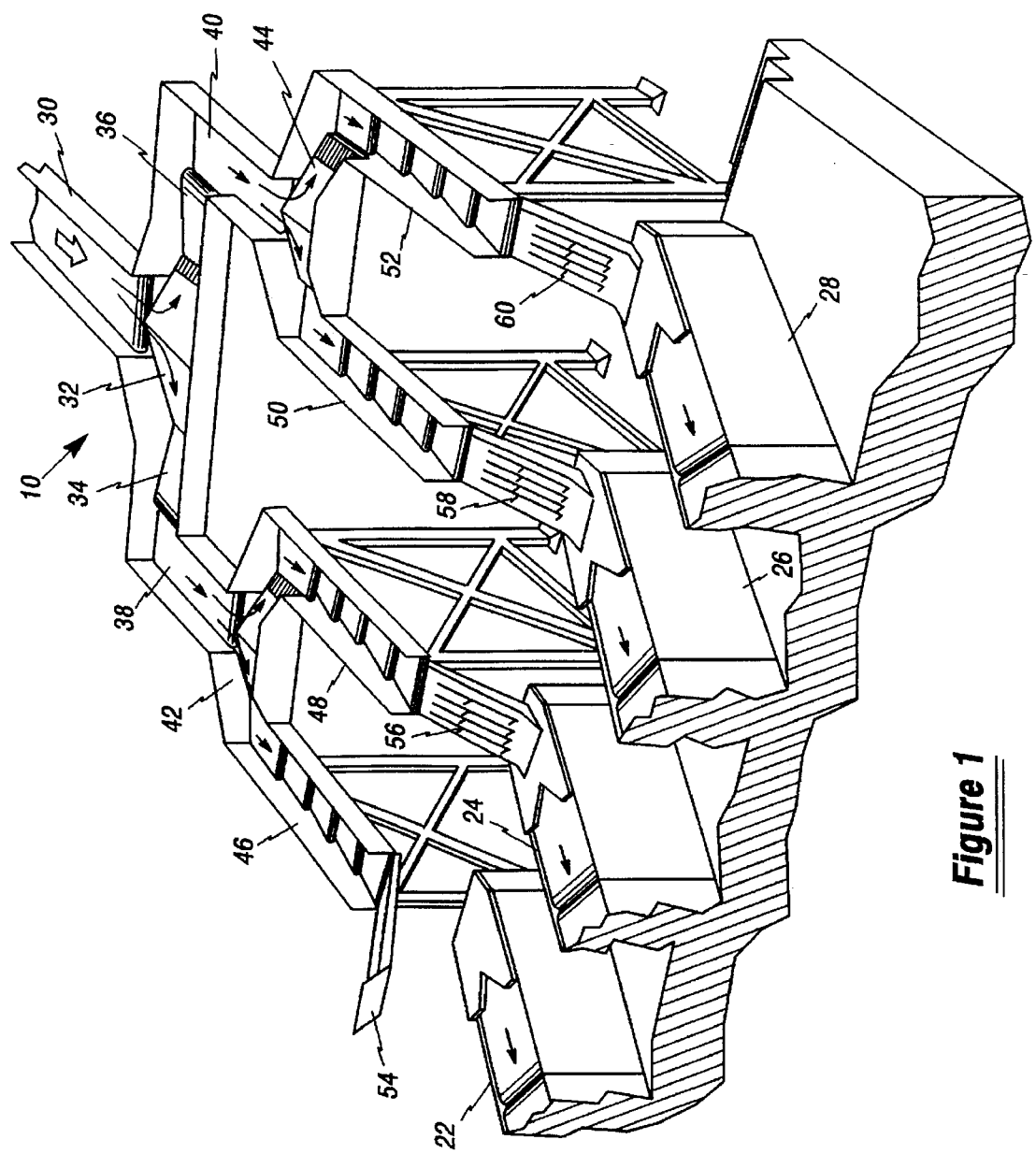
FIG. 1 shows, in a pictorial view, one embodiment of a multi-lane parcel and bundle singulation system according to the present invention, with a portion of a mail sorting system served thereby.
Figure 2:
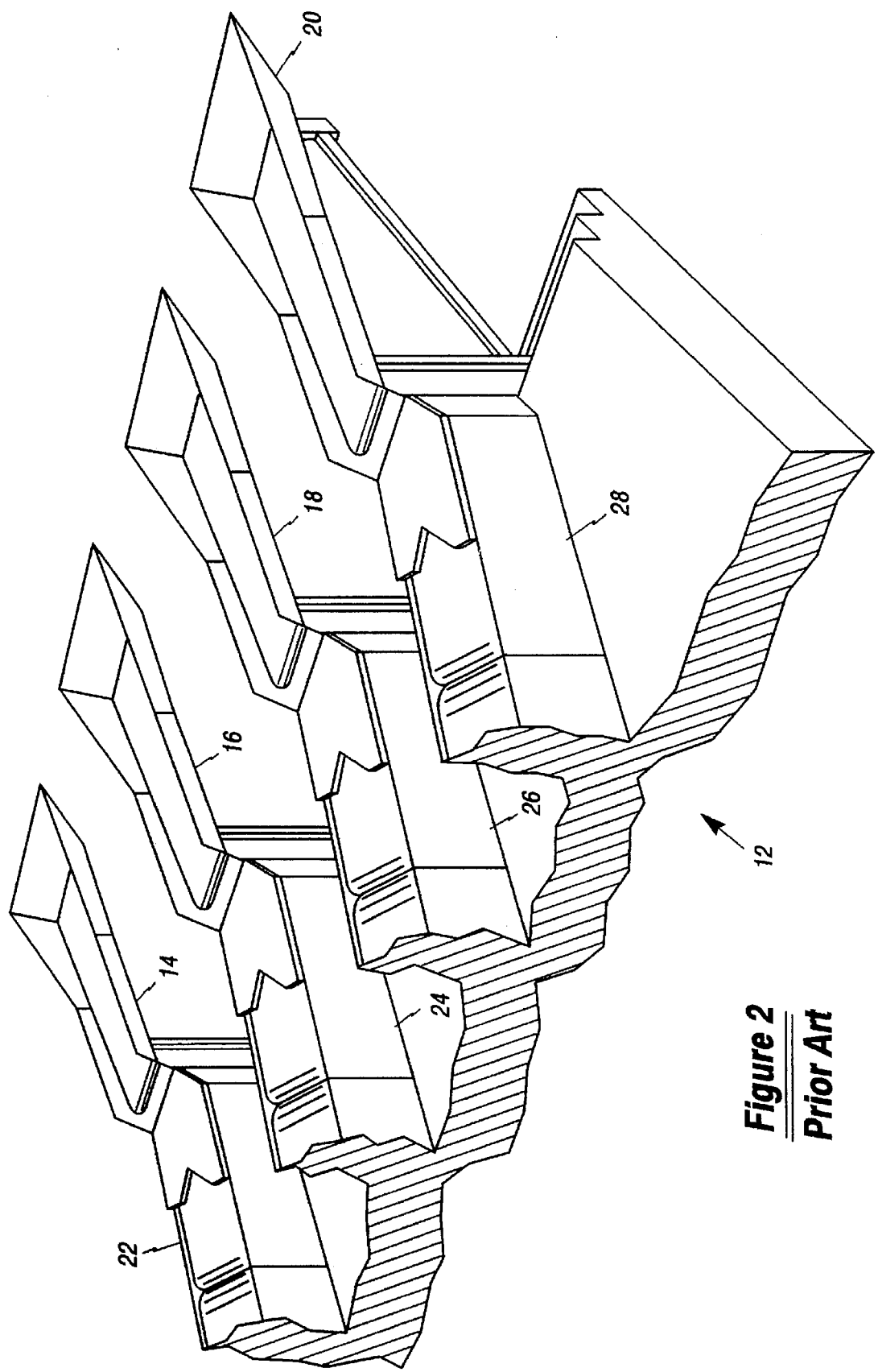
FIG. 2 shows, in a pictorial view, a portion of a parcel and bundle sorting system in the prior art.

Referring now to the drawings, wherein like reference characters designate like or corresponding parts throughout the several views, there is shown in FIG. 1 an overview of a fully integrated multi-lane parcel and bundle singulation system 10 which delivers individual items to a multiplicity of input stations in a material processing system. As shown in FIG. 1, the system 10 can be installed above existing work areas so that current induction processing methods may continue to be used should the need arise. Although the embodiment of FIG. 1 can deliver individual items to four input stations, it should be understood that the present invention can be utilized to provide individual items to any even or odd number of input stations. For example, the embodiment of FIG. 3 can deliver individual items to two input stations. FIG. 1 illustrates a fully integrated multi-lane parcel and bundle singulator system 10 which can be used to process bulk mail, or other non-uniform materials, in conveyance from a single (or multiple) source of supply. System 10 progressively divides the supply into a multiplicity of flow lines, and singulates the material to simplify its induction into processing equipment. This is to be contrasted with the prior art system 12 of FIG. 2, wherein four individual chutes or slides 14, 16, 18 and 20 are provided onto which mail parcels are loaded by hand for provision to respective sorters 22, 24, 26 and 28.

In system 10 of FIG. 1, an overhead supply conveyor 30 provides a flow of parcels, bundles and other packages to flow control slide 32. Flow control slide 32 divides the flow of packages among receiving conveyor 34 and receiving conveyor 36. Packages thus provided to conveyor 34 are conveyed to conveyor 38 and thence to flow control slide 42. Packages thus provided to conveyor 36 are thereby conveyed to conveyor 40 and thence to flow control slide 44. Flow control slides 42 and 44 are needed so that the flow from conveyor 30 can be divided among four sorter induction stations 22, 24, 26 and 28, as shown in FIG. 1. A greater or lesser number of flow control slides would be needed for such provision of packages to a greater or lesser number of users. See, for example, FIG. 3. For the configuration of FIG. 1, flow control slide 42 divides the flow of packages from conveyor 34 among singulators or singulating conveyors 46 and 48, while flow control slide 44 divides the flow of packages from conveyor 36 among singulators or singulating conveyors 50 and 52. Each singulating conveyor 46, 48, 50 and 52 separates and spaces from each other the packages that it receives. Each singulating conveyor 46, 48, 50 and 52 also reorients each package so that its vertical surfaces (if any) are either parallel to or perpendicular to its direction of movement, along their direction of movement, or accomplishes "squaring" of the packages that it receives. Each singulating conveyor 46, 48, 50 and 52 provides singulated, squared packages to a respective delivery slide 54, 56, 58 and 60. Each delivery slide 54, 56, 58 and 60 maintains the singulated, squared condition of the flow of packages that it receives. In FIG. 1, one delivery slide 54 is shown in its stored or inactive position as distinguished from the operating position shown in FIG. 1 for delivery slides 56, 58 and 60. A delivery slide would be placed in its unused or stowed position because of an upstream or downstream malfunction, or if at that time its user (for example, an attendant at a sorter induction station) to which it would ordinarily provide a flow of packages is then not needed or not operating. For the arrangement shown in FIG. 1, with delivery slide 54 in its stowed position and delivery slides 56, 58 and 60 in their operating positions, flow control slide 42 would be in the position of FIG. 5 or the position of FIG. 6, so that packages would not be provided to singulating conveyor 46. Each delivery slide 54, 56, 58 and 60, if operating, provides a singulated and squared flow of packages to a respective sorter induction station 22, 24, 26 or 28.

Figure 3:
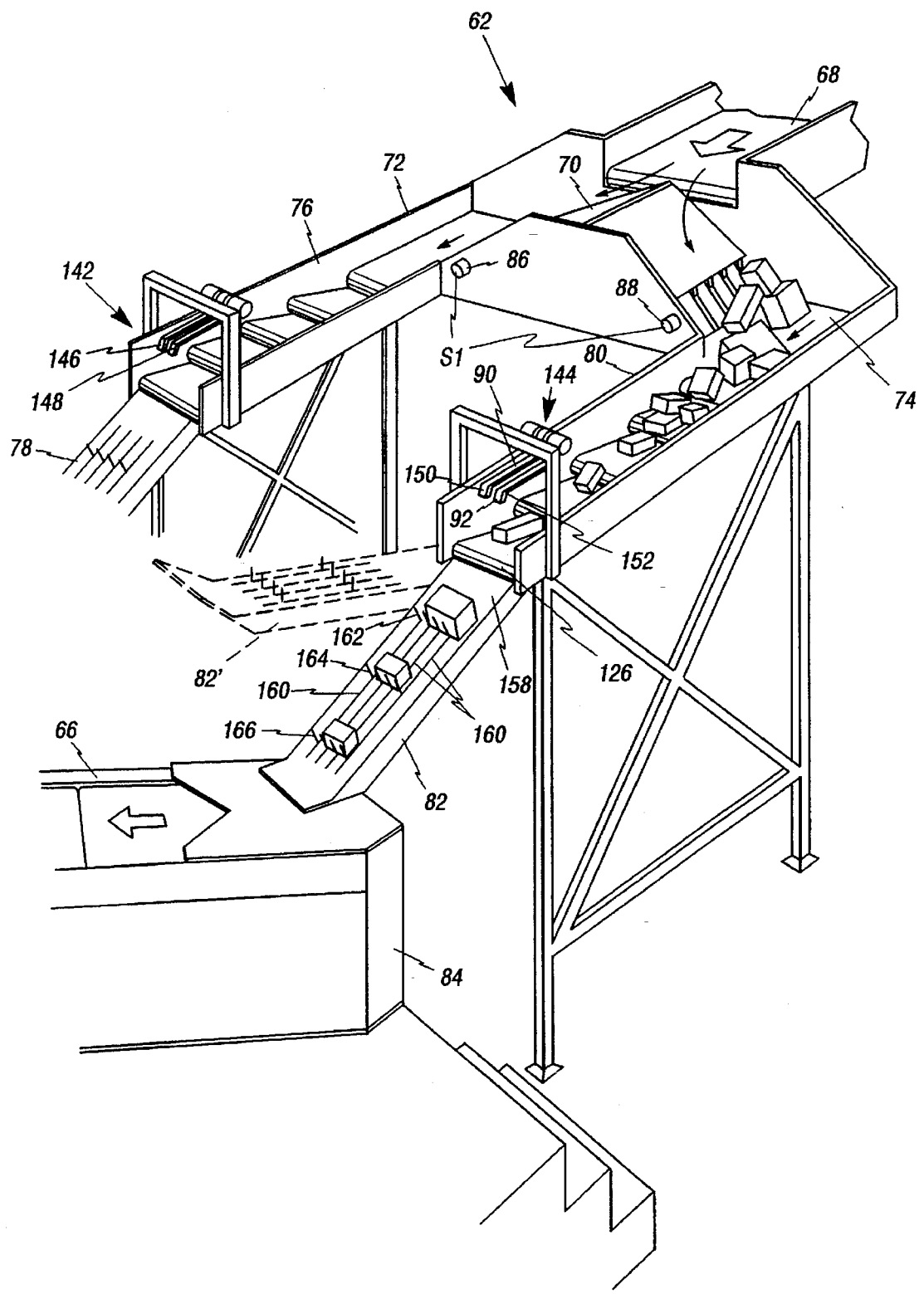
FIG. 3 shows, in a pictorial view, another embodiment of a parcel and bundle singulation system according to the present invention, and shows, in respective solid and skeleton views, a portion thereof in respective operating and stored positions.

The number of flow control slides, singulating conveyors and delivery slides would be increased if more sorter induction stations or other users were to be served thereby. Likewise, the number of flow control slides, singulating conveyors and delivery slides would be reduced if fewer sorter induction stations or other users were to be served thereby. For example, an embodiment of the present invention providing squared and singulated packages to two sorter induction stations 64 and 66 is illustrated as system 62 in FIG. 3. FIG. 3 illustrates a parcel and bundle handling and singulation system similar to that of FIG. 1 but with delivery of singulated items to only two input paths. FIG. 3 illustrates a system similar to that of FIG. 1 but which divides the flow of material, or contains an item flow separation, into two paths rather than the four paths of FIG. 1. In FIG. 3, overhead supply conveyor 68 provides a flow of parcels, bundles and other packages to a flow control slide 70. Slide 70 divides the flow from conveyor 68 and apportions same between two flow paths. Packages (e.g. parcels and bundles) provided by overhead supply conveyor 68 are provided by flow control slide 70 to either of receiving conveyor 72 or receiving conveyor 74. Package flow from conveyor 68 can be divided by slide 70 among conveyors 72 and 74, or can be provided by slide 70 to only one of conveyors 72 and 74. If slide 70 provides any packages to receiving conveyor 72, then receiving conveyor 72 provides a flow of packages to singulating conveyor 76. Singulating conveyor 76 singulates and squares the packages provided thereto by receiving conveyor 72, and provides these packages to delivery slide 78 from which packages are provided to a sorter induction station (not shown). Delivery slide 78 maintains the separation between received packages in delivering them to that induction station. Likewise, any packages provided by slide 70 to receiving conveyor 74 are provided by receiving conveyor 74 to singulating conveyor 80. Singulating conveyor 80 singulates and squares these packages (e.g. parcels and bundles) from receiving conveyor 74, and provides them to delivery slide 82. Delivery slide 82 maintains the separation between received packages in delivering them to induction station 84. A ghosted view in FIG. 3 shows delivery slide 82 raised in its stowed or stored position 82'. Flow control slide 70 is controlled by flow sensors 86 and 88, or preferably by a plurality of such sensors disposed at various locations at each output of slide 70. If a greater flow of packages is detected to one side or output of slide 70 than appears at the other side or output of slide 70, then slide 70 would be adjusted to even out that flow by providing fewer packages to the side having greater flow and thus providing more packages to the side with lesser flow. A preferred embodiment of how such detection can be accomplished is described below.

As shown in both FIG. 1 and FIG. 3, one or more flow control slides or flow-metering slides can be employed to subdivide the flow of items being supplied from a single bulk supply conveyor. Lateral shifting of each of these slides will regulate the distribution to either of its sides in any proportional flow desired. Referring to FIG. 3, the advancing items move onto the flow metering slide 70 to make an initial division in its flow. The two newly created flow paths respectively move the items therein onto receiving belts 72 and 74 which respectively transfer and direct the flow into singulation conveyors 76 and 80, respectively.

Each flow control slide or flow metering slide 32, 42, 44 and 70 is capable of regulating the flow of items to any of its divided output paths. Using two arrays of optical sensors each placed in strategically located positions, the flow is monitored along each output path from the slide to detect starved or oversupplied flow lines. In order to regulate the flow of mail, the sensors are arranged in a configuration that will provide a "pseudo-volume". The pseudo-volumetric status or pseudo-volume measurement status of each spillway is used to laterally shift the peak position of the metering slide to move that peak in either direction from its mid-point location of FIG. 4. This allows more items to flow into one path and less in the other path. Moving the slide to either extreme end or limit of its travel, shown in FIGS. 5 and 6, will completely cut off the supply of items to one output path from the slide, and fully open the other output path. In the event that both flow paths are oversupplied, the supply conveyor 68 can be directed to temporarily stop its advance and allow the overload to deplete itself by movement of items downstream.

Figure 7:
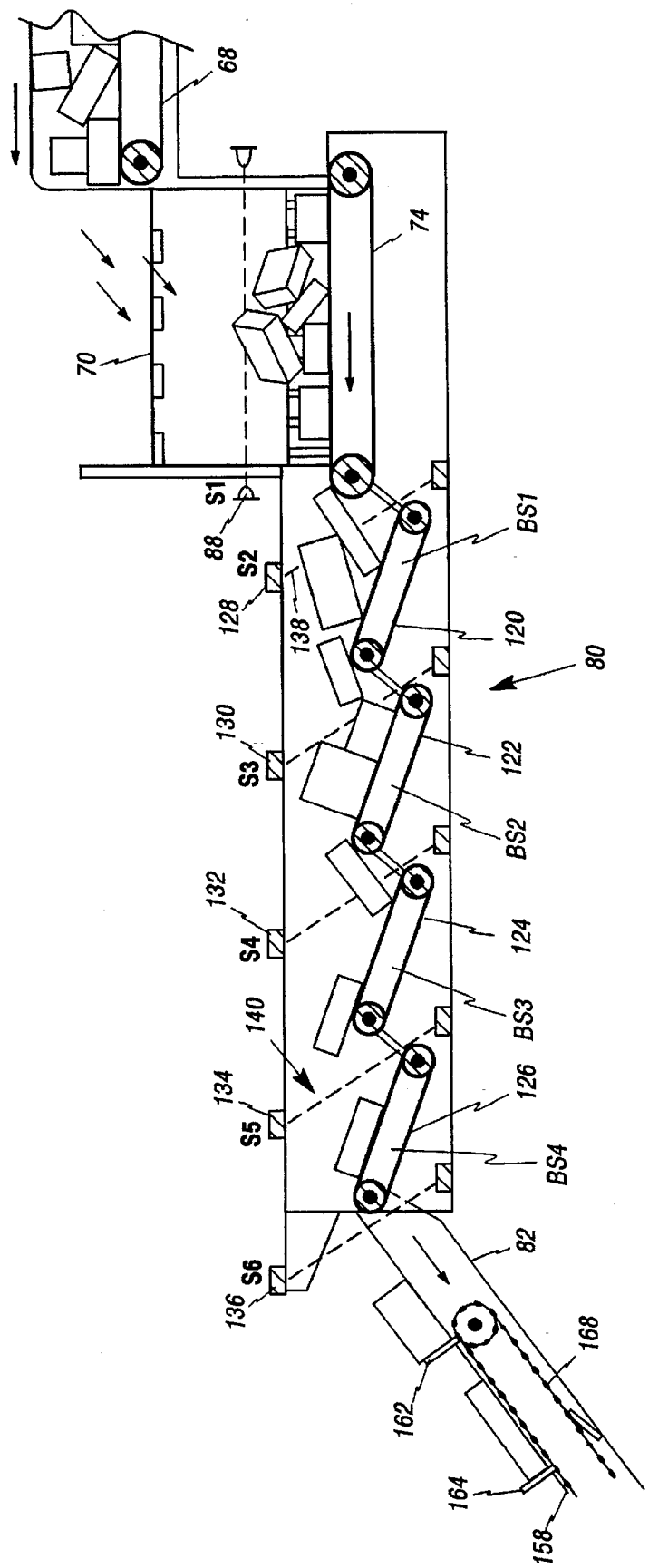
FIG. 7 is a side view (with one side wall removed) of a portion of the system of FIG. 1 or the system of FIG. 3, showing greater detail in an enlarged view.
Figure 8:
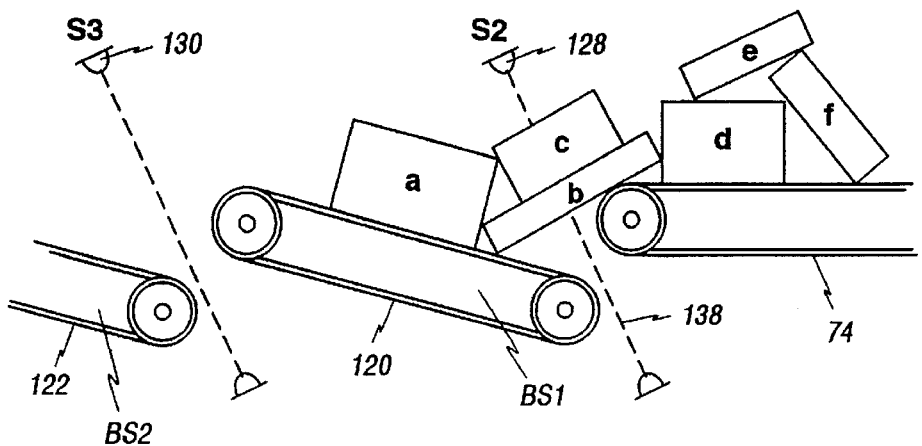
FIG. 8 illustrates one stage of operation of a portion of the apparatus of FIG. 7.
Figure 9:
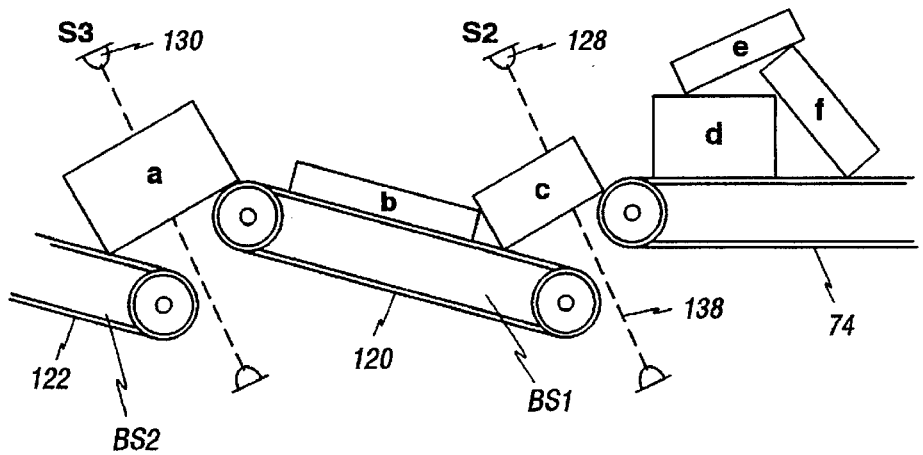
FIG. 9 illustrates another stage of operation, subsequent to that of FIG. 8, of a portion of the apparatus of FIG. 7.
Figure 10:
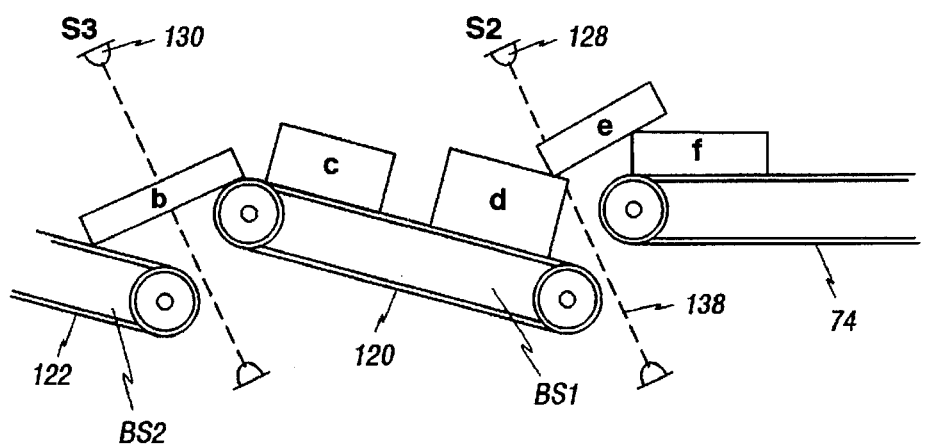
FIG. 10 illustrates yet another stage of operation, subsequent to that of FIG. 8 and that of FIG. 9, of a portion of the apparatus of FIG. 7, for singulation of parcels and bundles.

The flow of bulk items deposited on the receiving belts by the metering slide is conveyed and advanced into conveyor systems which perform the singulating function. The conveyors are comprised of a multiplicity of forwardly inclined transport belt stages such as are shown in FIG. 7. Each such belt stage conveys the items up the incline of that belt stage, over the crest of that belt stage, and onto the base of the next downstream stage (if any). An example of this process is shown in FIGS. 8, 9 and 10. Each such stage is independently controlled and operated so that the advancement of items from stage to stage can be directed to continue, or be temporarily (e.g. momentarily) inhibited. This is accomplished with the aid of optical sensors positioned at strategic locations above each such stage. Sensing the absence or presence of items in one stage dictates whether the immediately preceding (upstream) stage is required to advance its occupant(s). By the time that the item flow arrives at the output end of the singulating conveyor, the number of parcels or bundles or other packages which rest on the output belt stage at any one time has been reduced to one by this process.

Under certain circumstances, it is reasonable to expect that two parcels (or the like) can be occasionally conveyed side-by-side along the length of the conveyor and, if uninhibited, could be delivered to the operating attendant or other user simultaneously. While this would only cause a minor interruption in the normal handling procedure for manually inducting mail, such a human operator would still be able to process the two items efficiently, one piece at a time. However, more serious problems could be encountered if an automated feed is to be used instead. For either situation, to reduce the occurrence of this condition, retractable inhibit arms 90 and 92 can be situated above the downstream or last singulator belt stage 126. However, the number and location of these inhibit arms is not limited to the final or end position shown in FIG. 3. On demand, when optical sensors detect a double feed condition, these arms 90 and 92 can be extended to momentarily prevent advancement of an item at one side of the conveyor path while its adjacent neighbor is free to be advanced. This provides an additional means of producing separation between the items to be singulated.

The operating attendant is required to receive individual items of mail delivered to the induction station. To accomplish this task, singular items must be lowered from the corresponding overhead singulating conveyor (e.g. conveyor 46, 48, 50, 52, 76 or 80) and be deposited on the work surface in preparation for induction (e.g. into a sorter). This is accomplished by a slide surface containing support fingers set at fixed pitch intervals which under positive control, are incrementally lowered to present singulated items to the operator. Induction is accomplished when the operator loads the item and enters address information in the processing equipment. This automatically initiates a call for delivery of the next waiting parcel or bundle on this slide. Through a process control system (further described below), all upstream conveying and singulating functions are also made to react to this call.

The respective parcel and bundle handling and singulation systems of FIGS. 1 and 3 are preferably installed above the equipment it services. The system can be easily supported by a structure which permits full access to any existing input equipment which may be present. For example, if in an application the occasion arises where singulation is not required, existing input equipment could be retained and used as before. All that would be required of the system is that its lowering or delivery slide be raised and retracted out of the way of the operating attendant, such as is illustrated in FIG. 3.

The following describes in greater detail how the system of FIG. 1 and the system of FIG. 3 each receive bulk items from a supply conveyor, divide its flow into two or more paths in varying proportions, transfer items onto receiving conveyors, produce multiple flows of individual items and deliver singular items to operator attendants for induction into processing equipment. Although FIG. 3 is specifically discussed below, this description also applies to corresponding portions of FIG. 1.

In the operating description which follows, assume that no material to be singulated exists on any portion of the system 62 illustrated in FIG. 3, and that bulk items are on the supply conveyor 68 awaiting a signal to advance and begin the process. The flow-metering slide 70 is initially positioned at its mid-point "home" position as shown in FIG. 4, and the receiving conveyors 72, 74 and all singulator belt stages are functioning, ready to operate on the material as it arrives.

As the supply of items advances onto the flow-metering slide 70, the peak 96 of the slide serves to divide the flow of items from supply conveyor 68 into approximately equal parts. This proportion remains unchanged so long as each newly created flow path contains an adequate supply of items and does not become overfilled. Sensors 86, 88 (S1) monitor the overfull/not overfull status on the slide of each spillway slope 102, 104, respectively. If these sensors 86, 88 detect a volumetric status in one such path above a predefined threshold or detect a blockage in one such path, for a time interval which exceeds a predetermined or prescribed limit, a "full" indication for that path will result. This "full" condition indicates the need for flow control. This indication directs the slide system 70 to laterally shift its tent-shaped profile, thereby reducing or stopping the flow of mail to the overfull side of the slide system. If both sides of the slide 70 indicate a "full" condition, then the supply belt 68 feeding the spillways will be stopped. FIGS. 4, 5 and 6 illustrate how this can be preferably physically accomplished. These figures represent a cross-sectional elevation of the flow-metering system 70, but also apply to, for example, flow control slides 32, 42 and 44 of FIG. 1. FIGS. 4, 5 and 6 demonstrate the preferred mechanism by which a supply of bulk items can be variably divided into two paths. FIGS. 4, 5 and 6 each illustrate a supply conveyor (e.g. supply conveyor 68) with the flow-metering slide (e.g. slide 70) positioned directly beneath the conveying surface of that supply conveyor. The S1 sensors 86, 88 are also shown in their approximate relation to the flow paths at each side 102, 104 of the slide 70. To each side 102, 104 of the slide 70 are one or more respective receiving conveyors (e.g. conveyor 72 or 74) on which items diverted by the slide are deposited. The slide 70 includes two panels or plates 106, 108, connected at the peak point 96 by hinges 110. At the hinge joint 110, vertical supports 112 are also provided which are structurally attached to a mobile carriage 114 confined by guide tracks 116. The vertical supports 112 are designed to laterally move the slide 70 as the carriage 114 is shifted on its guide tracks 116. A motor and drive system serves as the power source which moves the carriage 114 in either direction on demand, based on the status of the S1 sensors 86, 88. FIG. 4 shows the slide at its mid-point or "home" position relative to the supply conveyor. In this configuration, the flow of packages (e.g. parcels and bundles) from supply conveyor 68 is divided into two approximately equal amounts. FIG. 5 shows the slide shifted to its extreme left limit, to imply that receiving conveyor "b" is overfull. FIG. 6 illustrates the converse, that receiving conveyor "a" is overfull. To ensure that thin items cannot become lodged beneath the slide, the bottom edges of the slide 70 rest on a bed or base 118 so that wherever the slide system is laterally positioned, its bottom edges remain engaged with the bed. This engagement, coupled within a corrugated interleaving of the slide's edges with grooves in the bed surface, effectively stop the entry of thin items into this area under the slide. In the event that both receiving conveyors 72, 74 become overfull, the supply conveyor 68 is directed to stop its advance. The slide system 70 will preferably continue to shift according to a crude volume measurement at each spillway. This will enable quick and accurate return to operation when the supply conveyor 68 restarts. The degree of lateral movement of slide 70 can be made to fluctuate and vary its travel distance to the right and left as supply and depletion rates vary. A suitable algorithm, provided below, controls the position of this slide as a function of variations expected in the material to be handled and the specifics associated with the implementation of the system in each application.

Items which are divided by the flow-metering slide 70 are each deposited on one or the other of receiving conveyors 72 and 74. Based on the amount of items which have accumulated on its surface, the upstream supply conveyor 68 is made to continue its advance, reduce its supply, or momentarily be stopped to allow an over-supplied condition to become depleted. As stated earlier, this is accomplished by shifting the flow-metering slide 70 and/or stopping the supply conveyor 68 from delivering its material.

Figure 4:
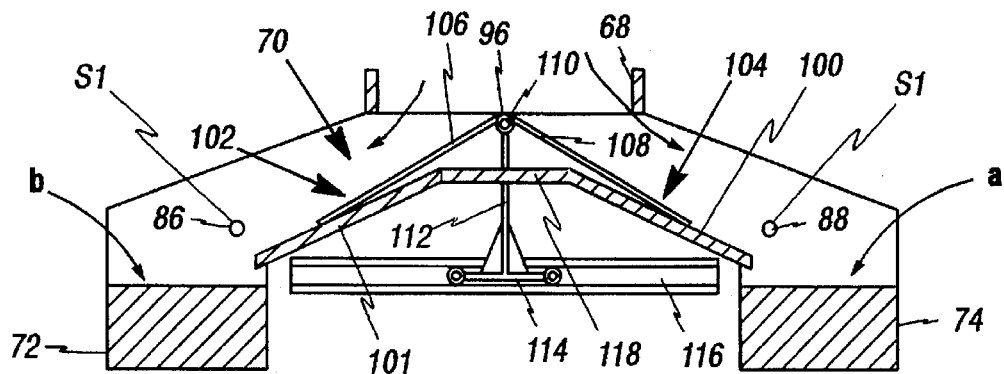
FIG. 4 is a cross-sectional view of one embodiment of a flow-control system according to the present invention shown in one operating position.
Figure 5:
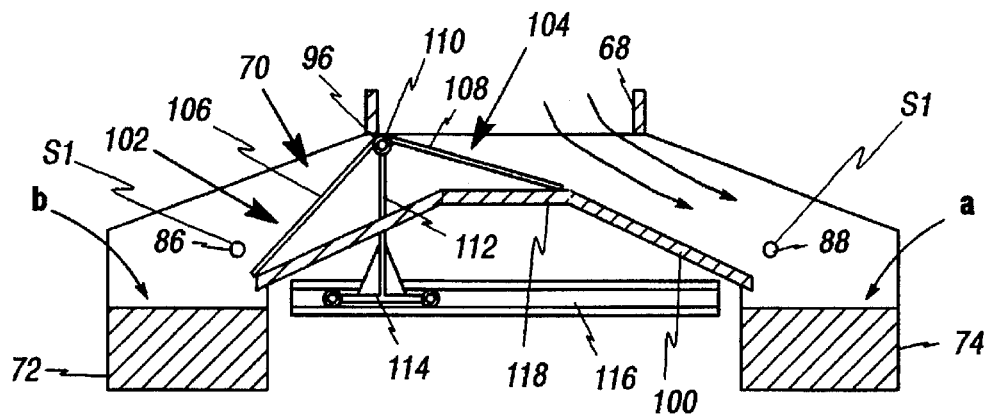
FIG. 5 is a cross-sectional view of one embodiment of a flow-control system according to the present invention shown in another operating position.
Figure 6:
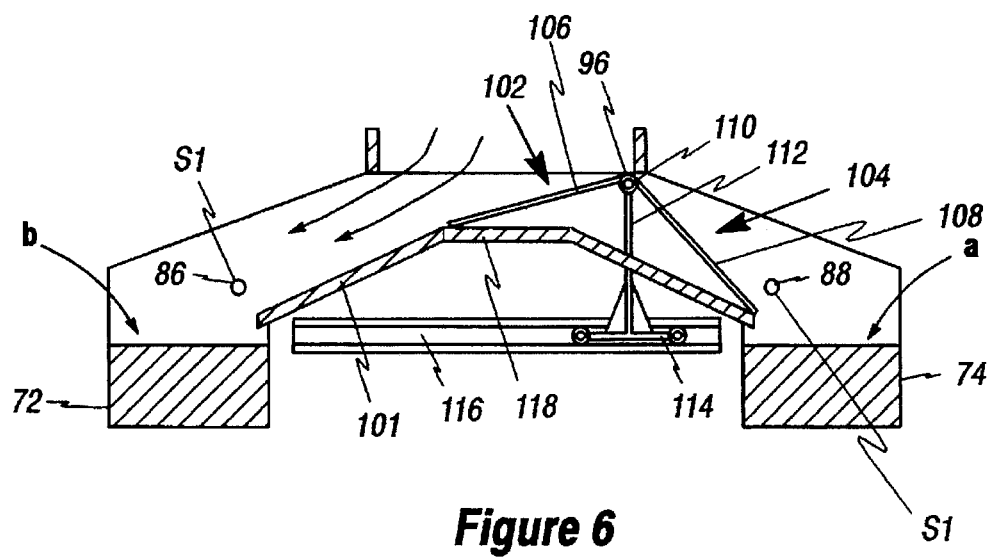
FIG. 6 is a cross-sectional view of one embodiment of a flow-control system according to the present invention shown in yet another operating position.

Flow control slide 70 is illustrated in greater detail in FIGS. 4, 5, and 6. However, FIGS. 4, 5 and 6 also apply to flow control slides 32, 42 and 44 of FIG. 1. As shown in FIGS. 4, 5 and 6, flow control slide 70 divides, and apportions, a flow of packages from supply conveyor 68 to receiving conveyors 72 and 74. FIG. 4 illustrates the position of flow control slide 70 for equal flow distribution between receiving conveyors 72 and 74. FIG. 5 illustrates the position of flow control slide 70 for provision of all of the flow from conveyor 68 to receiving conveyor 74. FIG. 6 shows the position of flow control slide 70 for provision of the entire package flow from supply conveyor 68 to receiving conveyor or distributing conveyor 72. The relative position of flow control slide 70 is determined by the output of S1 flow sensors 86 and 88, i.e. what they sense. If sensor 88 detects the presence of package(s) while flow sensor 86 does not, then slide 70 will move rightwards to provide at least an increase proportion of package flow to receiving conveyor 72. Likewise, if flow sensor 86 detects the presence of package(s) while flow sensor 88 does not, then slide 70 will move leftwards to provide at least an increase proportion of package flow to receiving conveyor 74. If both sensors 86 and 88 sense the presence of package(s), or if neither sensor 86 nor sensor 88 senses any packages, then flow control slide 70 would be moved towards a central position for more even distribution of mail between receiving conveyor 72 and receiving conveyor 74. Flow control slide 70 includes two plates 106 and 108 connected by a hinge 110. Hinge 110, and thus plates 106 and 108, are supported by one or more vertical supports 112. Supports 112 are mounted on a motor-driven, mobile slide carriage 114 that is activated and controlled by controller 98 based upon what is sensed by flow-monitoring distribution sensors 86 and 88. Carriage 114 moves along a track or path 116 whose ends define the limits of sideways movement of flow control slide 70. Flow control slide 70 also includes a trapezoidal base whose sloping sides 100, 101 readily permit the flow of packages thereon when exposed such as in the position of FIG. 5 or the position of FIG. 6 (although a portion of base 118 is exposed in FIG. 4 also). It is preferred that base 118 sloping side 100 has a slope at least as much as, if not greater than, the slope of plate 108 in the position of FIG. 5. Likewise, it is preferred that sloping side 101 have a slope at least as great as, if not greater than, that of plate 106 in the position of FIG. 6. Although the slope of plates 106 and 108 changes with the position of mobile carriage 114 and thus flow control slide 70, the position of sloping sides 100 and 101 does not change.

As can be seen in FIGS. 4, 5 and 6, flow-metering slide 70 includes two metal plates 106 and 108 that are hinged 110 together at facing edges and to at least one vertical support 112. The opposite edges of plates 106 and 108 slide on a fixed base 118 having a cross-section in the shape of a trapezoid. Lateral movement of support 112 due to lateral movement of mobile carriage 114 on track 116 moves the center of flow control slide 70 towards one or the other of a pair of receiving conveyors 72 and 74. Such lateral movement in cooperation with the trapezoidal base 118 changes the relative angle of the two plates 106, 108 and support(s) 112. Position of support(s) 112 is controlled by photoelectric sensors 86 and 88 respectively in or near the two receiving conveyors 72 and 74. In this manner, the relative proportion of mail provided to each of the two receiving conveyors 72 and 74 can be adjusted as needed. As shown in the illustrations of FIGS. 5 and 6 of the two extreme positions of flow control slide 70, the entirety of the received mail flow from supply conveyor 68 can be provided to one or the other of the two receiving conveyors 72 and 74 if desired. The peak 96 of two-way slide 70 can be moved to the left or right to vary relative proportions of mail flow going to each receiving conveyor 72 and 74. If one receiving conveyor, singulating conveyor, delivery slide or user is shutdown or broken, an extreme position of flow control slide 70 can be used so that the other side of the apparatus can still be operated. It is generally expected that sensors 86 and 88 will be blocked by the presence of one or more packages; if not, this is an indication to controller 98 that the corresponding receiving conveyor needs more packages.

Flow control slides 32, 42 and 44 are similarly configured.

FIG. 7 represents a side view of the singulation process. It demonstrates the flow of items as they are deposited on a receiving belt and are sequentially reduced to singularly conveyed items.

FIG. 7 includes a side elevation view of a receiving conveyor (e.g. receiving conveyor 74) and a number of its related singulating belt stages 120, 122, 124, 126 (BS1–BS4) which operate on the material being processed. However, the present invention is not to be construed as being limited to the number of singulation stages illustrated in FIG. 7, the number of such stages illustrated in FIG. 7 being desirable, but illustrative and not limiting. Also, the configuration of FIG. 7 is applicable to each of the receiving conveyors, singulating conveyors and delivery slides of FIGS. 1 and 3. Also shown at strategic locations between each belt stage are respective sensors 128, 130, 132, 134, 136 (S2–S6) which project beams of light (BOL) through the mail path. So long as these beams of light remain unbroken, the belt stages are made to run continuously. The beams of light thus represent a detection scheme for monitoring and controlling the mail in transit throughout the singulation process. Although illustrated as individual sensors, each sensor position S2–S6 may represent multiple sensors capable of creating complex light patterns, or a single sensor straegically located. Referring now to FIG. 7, a preferred procedure for singulating materials will now be described. Assume in the illustration of FIG. 7 that material to be singulated has been deposited on the receiving belt 74 and is available for singulation, but that no item as yet has been advanced beyond the receiving belt. Since sensor system S2 (sensor system 128) detects no material involvement, BS1 belt stage 120 (and all other unoccupied downstream belt stages) continue to run. Without material to be singulated, sensor system S2 also calls for items from its upstream neighbor or immediately preceding belt stage, the receiving belt. As the items flow onto the BS1 stage 120, the sensor S2 beam of light system 138 becomes blocked, causing stopping of the advance of the receiving belt 74. Belt stage BS1 will now have received at least one and most likely, several more items which are now under its control. Since belt stage BS2 (belt stage 122) still contains no material, belt stage BS1 is directed to continue its motion, moving its cargo forward to satisfy downstream demands. The evacuation of mail on singulation belt stage BS1 unblocks the sensor S2 beam(s) of light 138, resulting in restarting of the receiving conveyor 74 to deliver more material to the singulating conveyor 80. This process continues, providing momentary interruptions in the flow of material to "string-out" its advance to each of the succeeding belt stages 122, 124 and 126. This ultimately produces a singular or singulated flow of items. With the items positioned on each of the belt stages as shown in FIG. 7, sensor or sensor system S5 is shown to be unblocked. Yet singulation belt stage BS4 is occupied with an item which is not being called for by downstream stations. In this instance, the sensor S5 beam(s) of light or beam of light system 140 will indicate that the controller 98 must direct singulation belt stage BS3 (stage 124) to move until its occupant advances to block sensor or sensor system S5 (sensor or sensor system 134). This process continues to maintain a singulated flow, but allows the spacing between the singulated or singular items to be reduced to ensure a speedy response to downstream demands for singulated items.

FIGS. 8, 9 and 10 indicate in schematic form, the sequence of repeated events which occur, through identical belt stages, to effect parcel singulation.

FIGS. 8, 9 and 10 depict in schematic form, a sequence of events which are likely to occur in singulating material with conveyor 80 or the like. The singulation process is identical for all singulating belt stages in that each stage is controlled by the status of its downstream neighbor. FIG. 8 shows items resting on singulating belt stage BS1, which items have been advanced from the receiving conveyor (e.g. conveyor 74). One or more items will have been deposited on the belt. As shown in FIG. 8, the beam of light 138 for sensor(s) S2 has become blocked, stopping the advancement of the receiving conveyor 74. Singulating belt stage BS1 continues to run, since sensor or sensor system S3 is still unblocked and looking for material. In FIG. 9, singulating belt stage BS1 advances its cargo, item "a", to block sensor S3 while sensor S2 remains blocked to maintain the parked status of the receiving belt 74. When a call for material is made from one or more downstream stations, belt stage BS2 is instructed to advance its cargo, item "a". With item "a" departed, sensor or sensor system S3 becomes unblocked, activating singulating belt stage BS1. Item "b" is then advanced to block sensor or sensor system S3, and sensor or sensor system S2 thereby becomes unblocked, calling for more material from the receiving conveyor until sensor or sensor system S2 is blocked once again as shown in FIG. 10. This process, with the momentary delays it produces in the flow of items, is repeated along the conveyor path to achieve singulation.

In certain instances, the detection system which monitors and controls the item flow may be misled into believing that items passing from stage to stage have been singulated by the time they have reached the end of the singulating conveyor. This can occur if the sensors monitoring the flow of packages fail to recognize that two items are advancing along the conveyor path side-by-side and thus did not become completely separated into a singular or singulated flow. While this condition would only cause a negligible loss in processing productivity or throughput performance, it would tend to disrupt the mail handling pattern being used by the operator. For example, if two items have been deposited on one of the delivery slide's compartments, the control system may assume that's double feed is a singular item. When this compartment arrives at the induction point or operator load point, the attendant can visually observe a double feed. One of these two items is selected and inducted by the attendant, while the second item remains before the attendant, waiting its turn at induction. Of course, if a human attendant is not used to transfer items from the delivery slide to the sorter, then two items could be delivered side-by-side to the sorting machine undetected, possibly resulting in a mis-sort or other malfunction. Normally, the induction of an item automatically triggers the advance and delivery of the next item in line for processing. But, since another item (the other of the two side-by-side items) is already available for induction, the operator, for example, may signal the system by depressing a push-button to inhibit or delay by one advance cycle, the automatic call for the next item. Induction of the second such item would then initiate the resumption of automatic advance cycles. It is this deviation in handling procedures which can disrupt the operator's processing routine. The inhibit mechanism is designed to minimize this problem. As an additional convenience for the attendant, a special feed-delay control button is included to further advance operator comfort and efficiency.

Figure 11:
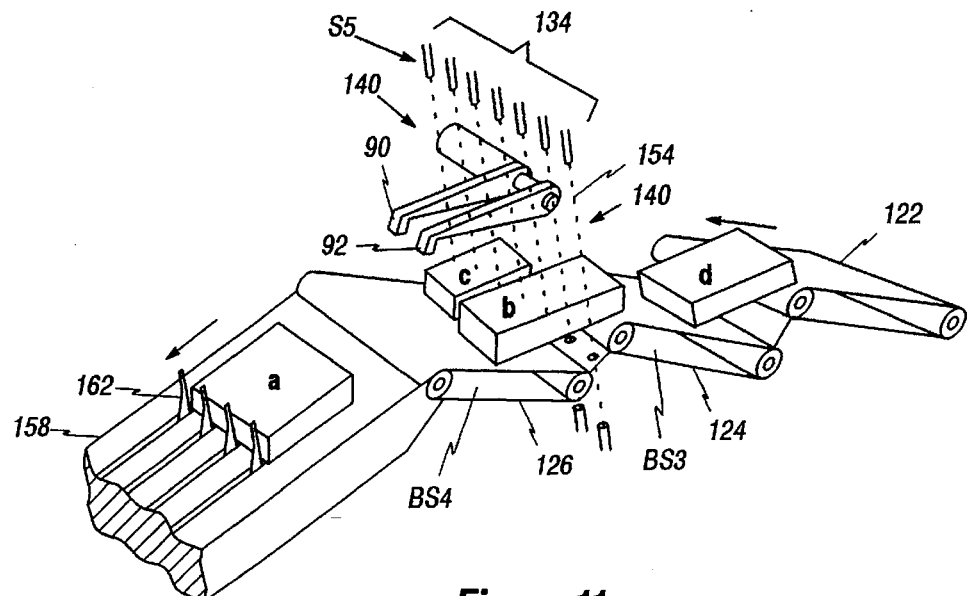
FIG. 11 shows, in a pictorial view, a portion of the apparatus of FIG. 7 in an enlarged view showing still greater detail.
Figure 12:
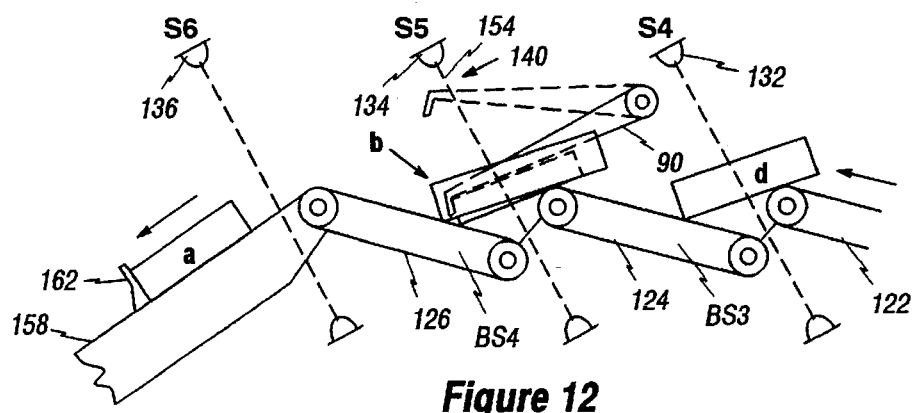
FIG. 12 is a side view of the apparatus of FIG. 11 shown in one stage of operation, with a portion thereof shown in respective solid and skeleton views in different positions in those views.
Figure 13:
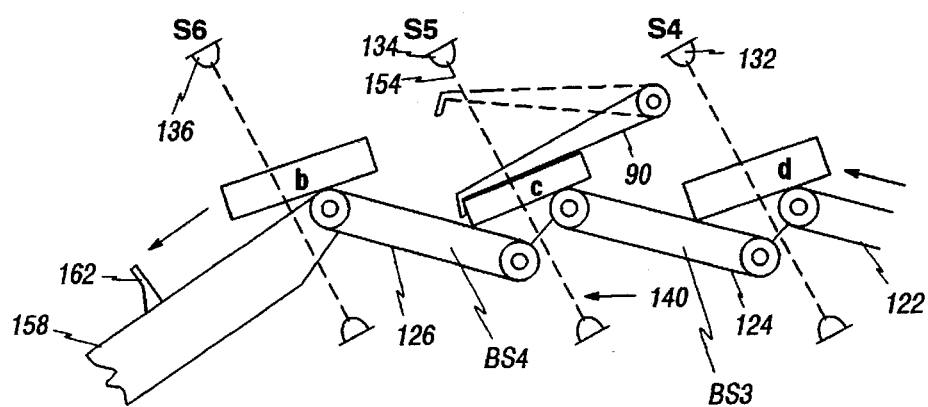
FIG. 13 is a side view of the apparatus of FIG. 11 shown in another stage of operation subsequent to that of FIG. 12, with a portion thereof shown in different operating positions in respective solid and skeleton views.

To ensure that separation of two items conveyed side-by-side through the singulation system can be realized, the system includes mechanisms 142 and 144 simply depicted in FIG. 3, which each assists in inducing separation of such items. This device is positioned above the last belt stage of the singulation conveyor. It includes one or more retractable arms (such as arms 146 and 148, or arms 150 and 152) of which can be pivoted and lowered to interfere with the flow mail at one side of a belt stage. Control of these inhibit arms is dictated by an array of sensors 154 (such as an array line of sensors) which detect the presence of mail passing through this stage. These sensors perform the same general function as the sensors on upstream stages (e.g. sensors 128, 130, 132, 134 and 136) but are configured as a more densely populated array of beams of light to broaden the scope of detection. FIGS. 11, 12 and 13 depict, in schematic form, how the device operates to induce a final attempt at singulation. FIGS. 11, 12 and 13 depict in schematic form, the sequence of events which occur to separate two or more items which have been advancing through the singulation conveyor side-by-side and thus have not been separated. FIG. 11 shows the arrival of items b and c, resting side-by-side on final singulating belt stage BS4 (stage 126). As shown in FIG. 11, both items b and c are blocking the array of sensors S5 (sensors 134) to stop the advance of singulating belt stage BS3 (stage 124) which contains item d. Item a has been deposited on the lowering slide (delivery slide), which is now awaiting a command to advance item a towards the point of induction on the sorter. As items b and c are advanced into the position shown in FIG. 11, their leading edges pass through the plane created by the beam(s) of light 140 which normally serve to direct upstream operations. The sensor or sensor system S5, however, is also made to scan the footprint of each item crossing its path. If only one item is present, its profile pattern can be recognized as a single item, even if its orientation relative to its direction to advancement is skewed. This is because the monitored footprint, or the recognition pattern that it is looking for, will be square or rectangular. Singular item patterns will allow the belt stages to function normally as in all preceding stages. However, when two or more items are present side-by-side, the detected footprint will not be represented by a single square or rectangular pattern. Instead, two patterns or an irregular pattern will be detected and, as shown in FIG. 12, the pivoted arm(s) would be directed to move into the mail flow path. When a call for mail at the induction station is initiated, item a is advanced to its next station and final singulating belt stage BS4 is also directed to move. As shown in FIG. 13, the movement of belt stage BS4 advances item b while the inhibited arm restrains item c from advancing. Item b is then delivered to the delivery slide to await the next call for material. Unlike the upstream sensors, when any item clears the beams of light of sensor system S6, this signals belt stage BS4 to stop its advance rather than call for more items and the inhibit arm, if employed, is directed to retract. Then, as the lowering slide receives its signal to make incremental advances according to downstream processing needs, belt stage BS4 is also directed to advance its occupant.

The lowering slide shown in FIG. 3 receives items from the overhead singulation conveyor and, through several successive cycles of advancement, moves singulated items to the operator for induction into processing equipment, or moves singulated items directly to such equipment. The delivery slide includes a low friction slide chute or surface containing a number of slots through which support fingers protrude to form the compartments. These fingers retain individual items as they are lowered for induction. Each row of fingers represents one of several compartments on the slide which are interconnected and conveyed by a roller chain. The chain and its sprockets are powered by a single drive motor. As items are inducted at the output end of the slide, the lowering drive is activated to lower individual items, one compartment pitch at a time. In so doing, a steady and continual supply of singulated mail pieces are presented to the operator easier processing.

Figure 14:
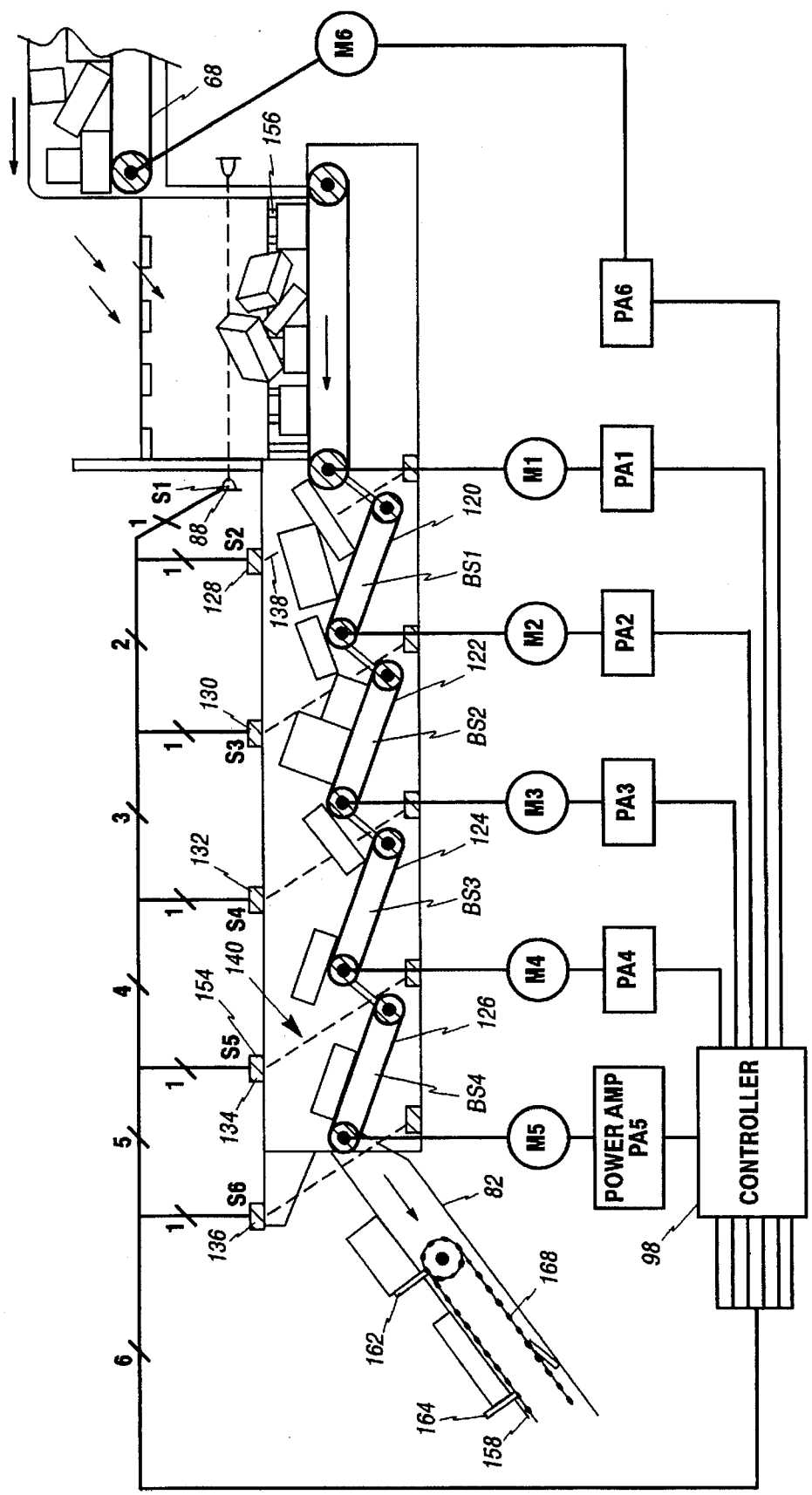
FIG. 14 is a side view corresponding to that of FIG. 7 but with control structure therefor added thereto.

FIG. 14 is a logic circuit diagram applicable to each of the belt stages for implementing the flow diagram shown in FIGS. 8–10 and 11–13.

FIG. 7 shows a side elevation of a portion of the package handling system of FIG. 3. However, it should be understood that the configuration of FIG. 7 is also applicable to the leftward portion of FIG. 3 and to corresponding structure of FIG. 1. In FIG. 7, parcels, bundles and other packages are illustrated as being delivered by supply conveyor 68 to flow control slide 70. Some of the flow of packages from supply conveyor 68 is provided by flow control slide 70 to receiving belt 74. Receiving belt 74 in turn provides a flow of packages to singulating conveyor 80. As stated above, singulating conveyor 80 singulates and squares these packages, and provides them to delivery slide or lowering slide 82. Delivery slide 82 in turn delivers the singulated and squared packages produced by singulating conveyor 80 to a user such as the induction point of a package sorting machine. The proportion of package flow from supply conveyer 68 that is provided by flow control slide 70 to receiving conveyor 74 instead of receiving conveyor 72 of FIG. 3 is based on input from S1 optical flow sensor(s) 88 and by similar S1 flow control sensor(s) 86 of FIG. 3. If (as illustrated in FIG. 7) any of S1 sensor(s) 88 are blocked, that would indicate that receiving conveyor 74 has an adequate supply of packages. If corresponding S1 sensor(s) 86 are not blocked, then flow control slide 70 would, in response, move rightwards to provide more mail to conveyor 72, relative to that provided to conveyor 74, than had been the case immediately previously. Grooves 156 (which can be interlaced) prevent packages from getting underneath flow control slide 70, provide support for each slide, and also provide one or more paths for one or more supports 112 for that slide. Singulating conveyor 80 includes a series of singulating stages. Although four such stages 120, 122, 124 and 126 for singulating conveyor 80 are illustrated in FIG. 7, and four such stages are preferred, it should be understood that, within the practice of the present invention, a working singulating conveyor can include more or less such singulating stages. However, at least three such stages are preferred for better singulation. Additional optical sensors S2–S6 for flow control are placed between each such singulating stage and at the input and output of each singulating conveyor. Thus, S2 sensor pair(s) 128 monitor flow from receiving conveyor 74 to BS1 singulating stage 120. S3 or sensor system sensor 130 is used to monito flow between BS1 singulating stage 120 and BS2 singulating stage 122. S4 sensor(s) 132 monitor flow between BS1 singulating stage 120 and BS2 singulating stage 122. S4 sensor(s) 132 monitor flow between BS2 singulating stage 122 and BS3 singulating stage 124. S5 sensor or sensor system 134 monitor any package flow between BS3 singulating stage 124 and downstream BS4 singulating belt stage 126. S6 sensor or sensor system 136 monitor any package flow between BS4 singulating stage 126 and delivery slide 82. As shown in FIG. 7, although package movement from receiving conveyor 74 to delivery slide 82 moves up and down, on the average package flow is preferably generally horizontal until delivery slide 82 is reached. As is more clearly shown in FIGS. 8, 9 and 10, singulation is preferably accomplished by having such average package flow horizontal, but having these packages pulled upwards by each singulating stage and then allowed to fall over a hump to the next singulating stage or to the delivery slide. As shown in FIGS. 8, 9 and 10, singulation is accomplished by having the package flow advance up and over forwardly inclined belt stages. Multiple such stages ensure that singulation is accomplished. Each singulating conveyor thus singulates a flow of packages through a series of progressions represented by the individual singulation stages of that singulating conveyor. Also, the individual singulation stages act as a series of stops; if the singulating belts do not move, then the packages also will not move, because of the incline of each singulating stage. Whether or not a belt of the singulating stage moves is determined by what is sensed by the flow sensors. As shown in FIG. 14, inputs from the flow control sensors 88, 128, 130, 132, 134 and 136 are provided in parallel to controller 98. In response, controller 98 provides a plurality of parallel outputs to a like plurality of power amplifiers, each such power amplifier providing its output to a motor controlling one of receiving conveyor 74 or a singulating belt stage 120, 122, 124 or 126. Controller 98 provides outputs to pwoer amplifiers. Each power amplifier interfaces with one motor. There is one motor for each receiving conveyor, and one motor for each singulating belt stage, thereby dictating the number of motors and power amplifiers needed in a system. A package will not be moved downstream if the immediately downstream flow sensor already detects the presence of package(s).

Further regarding FIG. 7, sensors 128, 130, 132, 134 and 136 detect the presence of packages so that controller 98 can accordingly regulate the belt advances of each singulating segment or module 120, 122, 124 and 126. The belt of each such singulating stage is thereby independently advanced and controlled. As a package spills from one belt stage to the next, it is reoriented so that its vertical surfaces are either parallel to or perpendicular to its direction of movement, also known as squaring.

As with the other singulating conveyors, singulating conveyor 80 is horizontal, and includes several upwardly tilted conveyor belts that transport packages away from flow control slide 70 and receiving conveyor 74. The separation between the belts of stages 74, 120, 122, 124 and 126, and the action of the singulating stages in pulling the packages upwards to in effect fall over a hump, separates these packages. Separating these packages causes a continuous rather than an ebbing and surging flow of packages to be provided to delivery slide 82 and thus to the user. Each such singulating belt stage pulls the packages upwards, and then allows it to fall over to the next belt stage or to the delivery slide. This action separates the packages. Package separation is performed through sequential belt module advancements activated by photocell (or other sensor) detection and control.

Delivery slide or buffer-inserter snorkel 82 includes a slide 158 having a plurality of slots 160 through which sets of fingers 162, 164, 166, etc. project and move. These fingers are connected to and moved by motorized chain 168. Fingers 162, 164 and 166 can for safety be breakaway fingers, particularly if they project from the underside of slide 158. Sets of fingers 162, 164 and 166, etc., connected to chain 168 move in increments, moving and then stopping to wait for a command or request for another package. Since packages can slide down slide 158, stops or fingers 162, 164, 166, etc. are provided to keep the flow of packages singulated. Slide 158 can for example be a sheet metal gravity slide.

As shown in FIGS. 3, 11, 12 and 13, at the output of each singulating conveyor is provided a double-feed inhibitor in the form of a plurality of fingers. For example, as shown in FIG. 11, there is placed at the output of singulating conveyor 80 double-feed inhibit arms 90 and 92 disposed side-by-side, located between singulating belt stage 124 and 126, and controlled by S5 sensor pairs 134. As shown in FIG. 11, S5 sensor(s) 134 is preferably a row or line of sensor pairs which thereby can sense whether two packages are being provided side-by-side. In response to detection of side-by-side packages by S5 sensor(s) 134, one or more of inhibit arms 90 and 92 are lowered to restrain one of these side-by-side packages while the other such package is free to advance. Side-by-side packages can thereby be separated. One or more such inhibit arms can be selected dependent upon the width of the side-by-side packages as detected by S5 sensor(s) 134. Detection of side-by-side packages activates selected inhibit finger(s) to induce separation of such packages, by inhibiting the forward progress of all side-by-side packages except one.

The buffer-inserter snorkel thereby delivers single packages directly to a user. For example, such packages can be provided directly to a load belt, or to a human attendant for loading.

Figure 15:
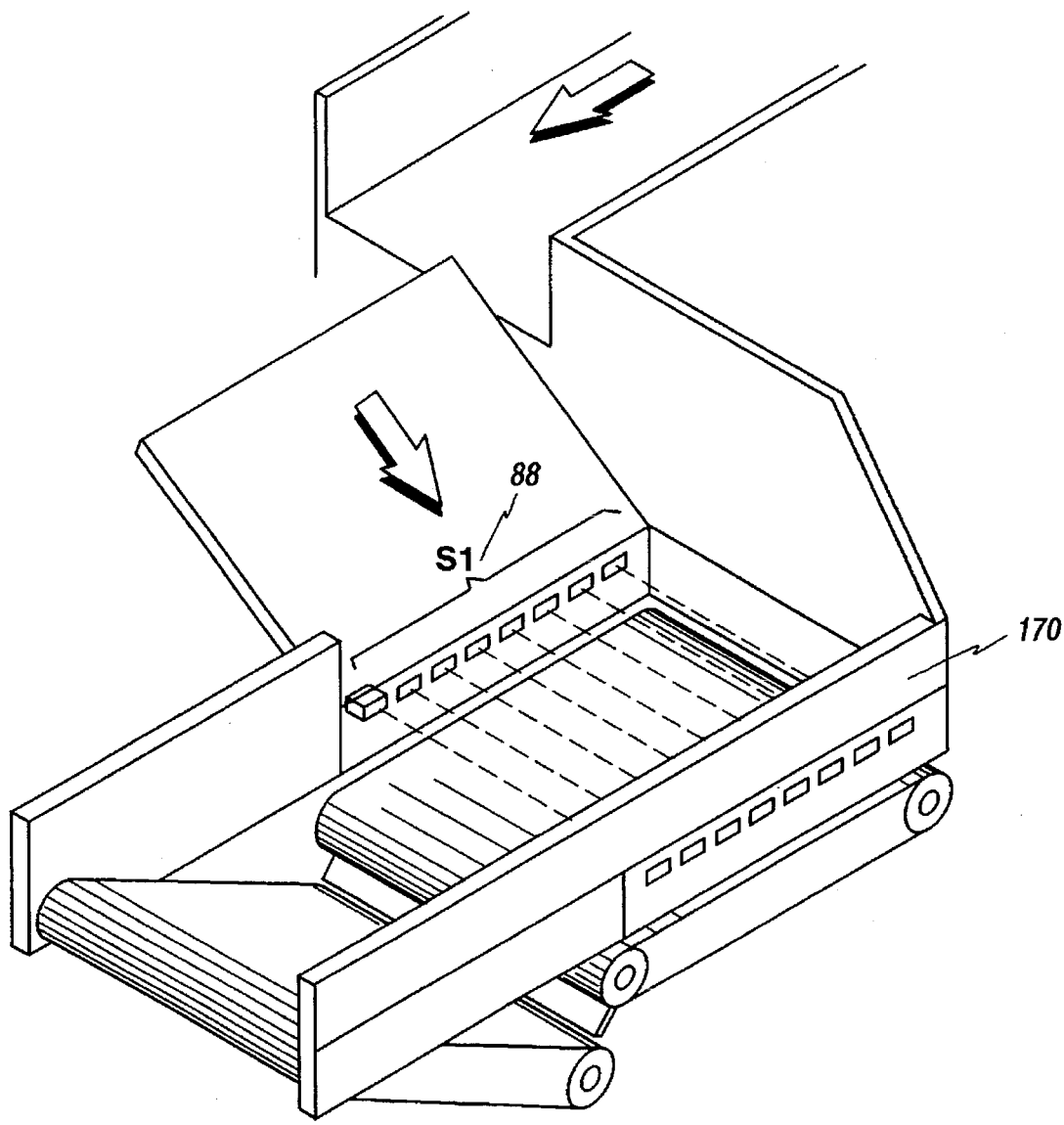
FIG. 15 illustrates a portion of the apparatus of FIGS. 7 and 14 in an enlarged view showing still greater detail with respect to one embodiment of how the operating position of the flow control system of FIGS. 4, 5 and 6 can be controlled.

The term "pseudo-volume" will now be further explained by reference to FIG. 15. For optimal operation of flow control slide 70, it is preferred to know how full each receiving conveyor 72 and 74 is. This is accomplished using the S1 sensor systems 86 and 88. Sensor system 86, and sensor system 88, are each a horizontally arranged array or line of sensors, each disposed in a semi-enclosed area above receiving conveyor 72 or 74. As shown in FIG. 15, S1 sensors 88 are disposed in a semi-enclosed area 170 above receiving conveyor 74. A similar semi-enclosed area is provided above receiving conveyor 72. This array of sensors 88 is used to create a pseudo-volume. This measurement is used to balance the level of mail on each side of slide 70. A pseudo-volume is created by integrating the number of photocells 88 that are blocked. Although eight such photo-emitter/photocell pairs are illustrated in FIG. 15, any suitable number of such pairs can be utilized as sensor system 88. This is referred to as a "pseudo"-volume because it implies something that is not actually measured. A true volume measurement would rquire at least a depth measurement. However, actual volume measurement is not necessary for this purpose. Also, this measurement need only be as accurate as what it is compared with. In this case there is a similar measurement made on other side of the slide. The number of sensors 88 that are blocked is compared with the number of sensors 86 that are blocked, to provide an indication of relative package flow and indicate how full the receiving conveyor is. Thus, a pseudo-volume is a proxy way of detecting the volume or amount of mail in a conveyor by detecting what is present in one segment or slice of that volume.

Figure 16:
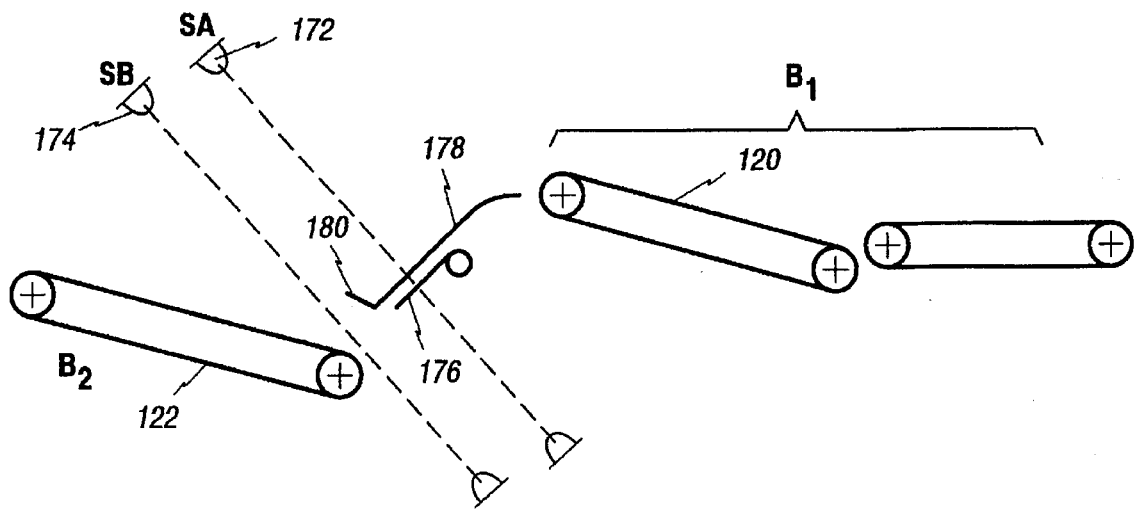
FIG. 16 illustrates one embodiment of a sensor arrangement that can be deployed in the apparatus of FIG. 7 and in the apparatus of FIG. 14.
Figure 17:
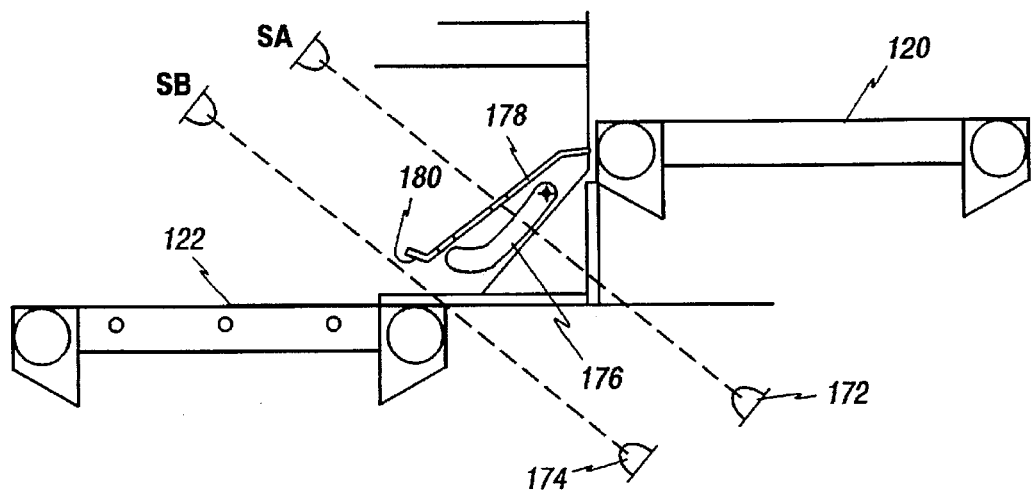
FIG. 17 is an enlarged view of a portion of the apparatus of FIG. 16 showing greater detail.

As discussed above, each sensor system in a singulating conveyor provides inputs for the control of the singulation belt preceding it. One arrangement of such sensors is illustrated in FIG. 16. Although in FIGS. 16 and 17 only two singulating stages 120 and 122 and one set of sensors 128 are illustrated therein, it should be understood that this configuration would be repeated for all sensors and singulation stages of FIG. 7. As shown in FIG. 17, each set of sensors 128 is in fact a pair of such sensors 172 and 174. Thus, a pair or other system of sensors SA and SB would replace each of sensors S2, S3, S4, S5 and S6 of FIG. 7. SA sensor 172 and SB sensor 174 of FIG. 17 dictate how control is applied to the conveyor belt according to the algorithm of Table I below.

TABLE I

| SENSOR STATES | | BELT RESPONSE | DEFLECTOR RESPONSE |
|---|---|---|---|
| SA | SB | B1 | D |
| Clear | Clear | Runs | Inactive |
| Blocked | Clear | Stops | Activates |
| Blocked | Blocked | Stops | Inactive |
| Clear | Blocked | Runs | Inactive |

In the algorithm of Table I, the downstream belt B2 of the two belts always runs, but whether belt B1 runs or stops, and whether deflector 176 is activated, depends on what sensors SA and SB detect. Thus, B2 is not directly inhibited by what is detected by sensors SA and SB. It should be noted that sensors SA and SB above dictate what happens to only the belt located immediately upstream of them according to the algorithm of Table I. Thus, the singulator can fill up like a buffer as needed. Also, timers may be used to track a package and override the sensors of FIG. 14 in special cases if desired. Deflector 176 is illustrated in greater detail in FIG. 17. An alternative control algorithm is given in Table II below.

TABLE II

| SENSOR STATES | | BELT RESPONSE | DEFLECTOR RESPONSE |
|---|---|---|---|
| SA | SB | B1 | D1 |
| Unblocked | Unblocked | Runs | Passive |
| Blocked | Unblocked | Stops | Active |
| Blocked | Blocked | Stops | Passive |
| Unblocked | Blocked | Runs | Passive |

As can be seen, Table II repeats the algorithm of Table I, using slightly different terminology for corresponding terms. Deflector 154 is a small actuator that is used to sequentially kick and release a second package from its supporting shelf 180 in the stage. A deflector 176 is employed between each pair of singulation stages of singulating belt 80. The deflector system is another aspect of this singulation system. Its function is to singulate two parcels that both fall over the crest of a belt stage. The solid plate 178, located between belt stages, has a stationary deflector or shelf 180 at its bottom. In addition, plate 178 has slot(s) for active deflector(s) or kicker(s) under the plate. The active deflector 176 or kicker arm is powered only if required, as indicated by the sensors. When activated, the deflector(s) 176 push up through the slot(s) of the plate 178, to gently kick the parcel off of the shelf 180 of stationary slide 178. The stationary plate 178 has a stationary deflector or shelf 180, designed to catch or retain a parcel. This is to singulate a parcel that may be piggy-backed on another parcel. The lower parcel will be hung up by the stationary deflector while the parcel on top of it slides onto the next belt. Then the active deflector will be required to kick the lower parcel off of the stationary deflector.

The stationary deflector 178 is not powered. The kicker 176 is preferably activated by a linear solenoid or a rotary solenoid. This solenoid is activated by the controller based upon sensor inputs. However, a friction clutch or other suitable means could be used instead.

Both a stationary and a powered deflector are present between the receiving belt and the first singulating belt.

There need not be a deflector between the last singulating belt stage and the delivery slide.

Regarding FIG. 7, the controller can for example be a digital controller. Each sensor S1 through S6 has its own separate input line to the controller. The controller can receive the sensor inputs in parallel. The controller can provide its control signals in parallel to what the six power amplifiers. The controller can poll or monitor the sensors in parallel, but it does not have to. It may poll the sensors at fixed durations of time, e.g., every 10 milliseconds, or it can act on each input as it changes state, i.e., be interrupt driven or logic based (the sensor signals drive hardware that changes as they do).

Regarding the pseudo-volume figure, a cross-sectional sliver taken across the top of the receiving conveyor belt, of the volume above the receiving conveyor belt is used to estimate what is going on in that volume. The error functions for the two sides should be equivalent.

Also, in contrast to FIG. 7, there may be multiple sensors at each location, one for the control of the belts and one for the control of the deflector or kicker.

Both the curved piece and the plate are deflectors. The solid plate, located between belt stages, has a stationary deflector at its bottom. In addition, there is an active deflector or kicker under it. The active deflector is powered only if required, as indicated by the sensors. When activated, the deflector pushes up through the bottom of the plate, to gently kick the parcel off of the stationary deflector. The stationary plate has the stationary deflector, designed to catch or retain a parcel. This is to singulate a parcel that may be piggy-backed on another parcel. The lower parcel will be hung up by the stationary deflector while the parcel on top of its slides onto the next belt. Then the active deflector will be required to kick the lower parcel off of the stationary deflector.

The stationary deflector is not powered. The kicker is preferably activated by a rotary solenoid. This solenoid is activated by the controller based upon sensor inputs.

Both a stationary and powered deflector are present between the receiving belt and the first singulating belt.

There need not be a deflector between the last singulating belt stage and the delivery slide.

Time delays may be added at appropriate stages to the algorithm of Table I or that of Table II to optimize its performance.

Some of the many advantages of the present invention should now be readily apparent. For example, novel apparatus and method have been provided for arranging or rearranging one or more streams of items by forming plural such streams. Novel apparatus and method have been provided for arranging or rearranging one or more streams of items by longitudinally respacing successive items in each such stream. A flow-metering slide has been provided which automatically subdivides a primary source flow of material. This slide is capable of regulating or momentarily stopping the flow to each of the subdivided paths it creates, as needed. A multiplicity of such flow-metering slides can be used to provide any number of subdivided flow paths which may be required by the equipment or process being serviced by the present invention. Also, a receiving conveyor has been provided which can accept material from the flow-metering slide and, in conjunction with the dictates of downstream operations, is directed to advance or remain at rest in its task of metering the flow of materials to a singulator. A singulation conveyor system has also been provided which is comprised of a plurality of individually powered belt stage modules which are each oriented to convey items up an incline and over the crest of its peak for deposit into the base of the next succeeding belt stage as part of the process of singulation; a plurality of strategically located optical sensors which detect, control and direct the movement of items through the series of belt stage modules as part of the process of singulation; a logic control system for independently controlling the movement of individual belt stage modules as dictated by the optical sensors described above; a motor control circuit designed to work in conjunction with the logic control system described above; and a double-feed inhibitor device containing one or more pivotable arms which, under control of the optical detection system, can be lowered to temporarily inhibit the movement of items in the path of the inhibitor device, allowing an adjacent item to advance freely and be singulated thereby. There has also been provided a lowering slide system which automatically advances such as under control of downstream operation to present individual items singulated by the present singulation system to a user which can for example be an attendant for induction into processing equipment. Furthermore, a parcel singulation system has been provided which is fully integrated with the flow-metering slides, receiving conveyors, singulation conveyor system and lowering slide system described above, to form a process which automatically accepts bulk mail or the like at one end and provides a steady stream of one or more output flows of singulated items.

An integrated system is thereby provided containing a variety of automated functions which is capable of accepting an intermixed supply of parcel and bundled mail, metering and controlling the flow of such mail, processing and singulating such mail, and disseminating such mail to a multiplicity of input stations for sortation or other processing. The present invention eliminates the task of selecting and handling individual pieces of mail in preparation for insertion into sorting and processing machinery, and lowers operating and equipment costs while increasing the ability of such sorting and processing machinery to perform at its full potential productive rate. The present invention introduces new techniques for preparing mail to be inducted into sort processing systems. These new techniques include a flow metering and control slide system, multi-stage singulating systems and dispensing slides. The entire integrated system of functions and processes can preferably be positioned overhead and can be configured for use in combination with or as an alternate input to existing sort processing equipment. The present invention combines and integrates new functions and techniques for singulating and distributing mail to several induction points. The system in its preferred embodiment is preferably strategically positioned overhead to conserve critical floor space and minimize interference with other operating equipment and personnel, and is preferably configured as illustrated to permit sort processing equipment to operate unimpeded in its present form, or be quickly and easily interfaced with the automated singulation system of the present invention.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. Apparatus for variably dividing a flow among two branch flow paths, comprising:

a base having first and second sloping sides and provided with at least one gap through said first and second sloping sides, said at least one gap being oriented in a first direction;

a member extending through said gap of said base;

first and second plates hinged to said member and to each other at respective first edges of said plates above said base, wherein a second edge of said first plate opposite said first edges slidably contacts said first sloping side of said base and a second edge of said second plate opposite said first edges slidably contacts said second sloping side of said base; and moving means connected to said member for moving said member in or opposite to said first direction.

2. Apparatus as defined in claim 1 wherein:

said member is moveable by said moving means in or opposite to said first direction between first and second positions;

when said member is in said first position, said first plate is oriented substantially coplanar with said first sloping side of said base; and when said member is in said second position, said second plate is oriented substantially coplanar with said second sloping side of said base.

3. Apparatus as defined in claim 1, further comprising:

first flow sensing means for sensing flow quantity past said first sloping side;

second flow sensing means for sensing flow quantity past said second sloping side; and control means, responsive to said first and second flow sensing means, for controlling said moving means.

4. Apparatus for variably dividing a first flow among a plurality of branch flow paths, comprising:

a member, first and second plates connected to each other and to said member to form where so connected a peak disposed in the first flow, the connection together of said first plate, said second plate and said member is a pivoted connection, and moving means for slidably moving said member substantially laterally of the direction of said first flow such that said peak is thereby moved laterally to vary proportions of material diverted to either side of said peak.

5. Apparatus as defined in claim 4, further comprising:

first flow sensing means for sensing flow quantity past said first plate;

second flow sensing means for sensing flow quantity past said second plate; and control means, responsive to said first and second flow sensing means, for controlling said moving means.

6. Apparatus as defined in claim 5 wherein:

said first plate is rigid;

said second prate is rigid; and said first plate and said second plate are inclined by said member.

7. Apparatus as defined in claim 5, further comprising a base having first and second inclined surfaces, wherein said first plate slides on said first inclined surface and said second plate slides on said second inclined surface.

* * * * *